Oct. 16, 1945.  E. A. STALKER  2,386,987

AIRCRAFT

Filed June 7, 1943

INVENTOR

Edward A. Stalker

By Marechal and Biebel

ATTORNEYS

Patented Oct. 16, 1945

2,386,987

UNITED STATES PATENT OFFICE 2,386,987

AIRCRAFT

Edward A. Stalker, Bay City, Mich., assignor to The Dow Chemical Company, Midland, Mich., a corporation of Michigan Application June 7, 1943, Serial No. 489,921

6 Claims. (Cl. 244—42)

This invention relates to aircraft and more particularly to wing construction.

It is the principal object of the invention to provide a simple and inexpensive aircraft wing having surface slots therein through which a flow of air is passed, the wing being constructed to have adequate strength to support the loads imposed, but not objectionably obstructing the flow of such air within the wing interior.

It is also an object to provide such a wing having adjustable flaps and in which flow passages are maintained substantially unobstructed in the several operating positions of the flaps.

The above objects are accomplished by the means illustrated in the accompanying drawing in which—

Figure 1:
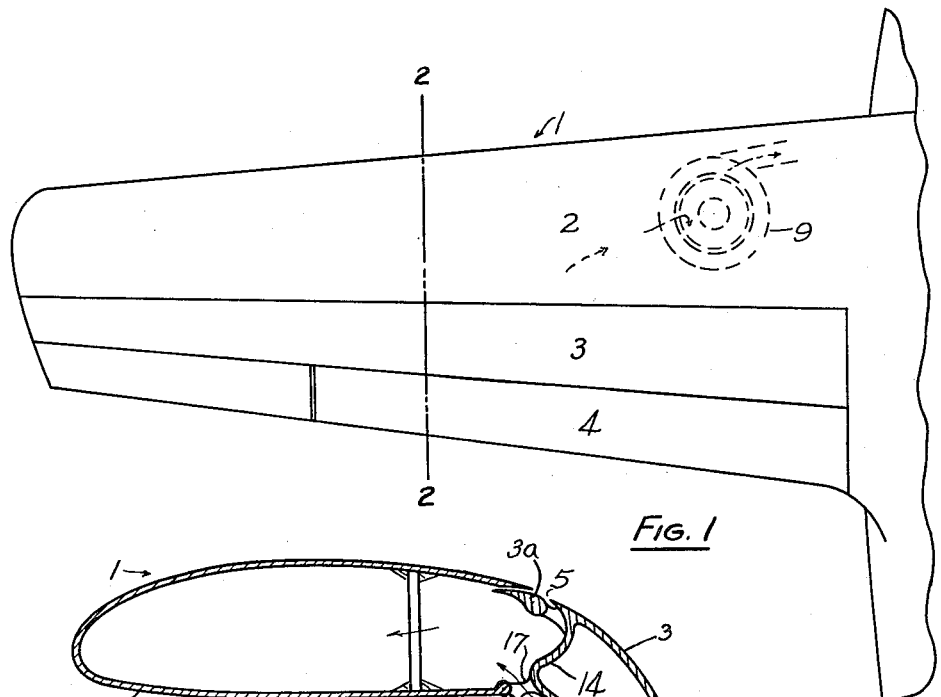
Fig. 1 is a plan view of a wing constructed in accordance with the present invention.
Figure 3:
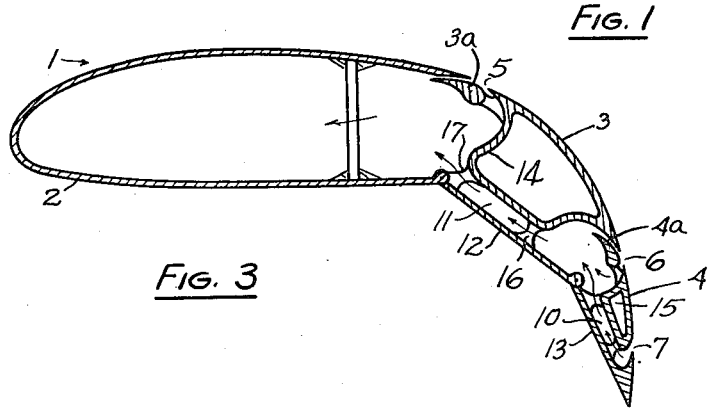
Fig. 3 is a section similar to Fig. 2 but with the flaps down.

In a wing employing surface slots through which a flow of air is passed, such as for developing a jet reaction, or for boundary layer control, it is difficult to provide a structure of proper strength to support the lift which at the same time does not offer such substantial resistance as to objectionably impede the internal flow of air. This difficulty has been resolved by the present construction where the wing is shown at 1, comprising the main body 2 and the articulated flaps 3 and 4. The flaps are suitably connected to be adjustable with respect to each other and with respect to the main body 2, preferably through a relatively large angle to afford a highly arched mean camber line, as represented in Fig. 3.

Figure 2:
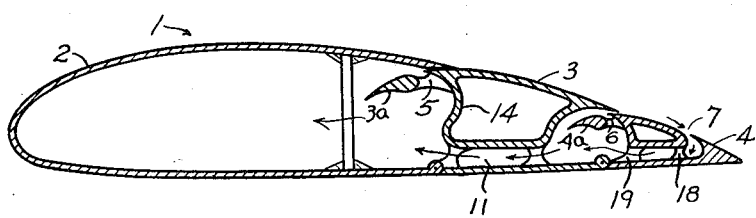
Fig. 2 is a section along the line 2—2 of Fig. 1.

A plurality of induction slots are formed in the upper airfoil surface. These slots if desired may be arranged to be closed by interfitting portions of the main body and flaps when the flaps are raised to the high speed position shown in Fig. 2, and if so arranged, are substantially ineffective under these conditions. They are made effective in the high lift position shown in Fig. 3; they may if desired be arranged to be effective in whole or in part in any or all of the relative positions of the flaps.

The slots are shown at 5, 6 and 7, slots 5 and 6 being formed in the forward portions of flaps 3 and 4 respectively. As shown, the slots extend through the forwardly projecting curved portions 3a and 4a of the corresponding flaps in such position as to be fully exposed when the flaps are depressed and closed when the flaps are raised. Slot 7 is located close to the rear end of flap 4 and since it is not affected by the change of position of the flaps, it remains effective throughout the range of positions of the flaps.

In the main body of the wing or at some other suitable location is the blower 9 which is preferably power actuated to cause a definite flow of air through the slots. This can be either a discharge or an induction, the latter being described herein for illustrative purposes. For this purpose, and to provide communicating passages for the flow to follow, the flap 3 is formed with a structural member 14 which is hollow in cross section and the upper surface of which forms part of the upper airfoil surface. Member 14 extends over a major part of the wing depth but its lower surface is spaced from the lower airfoil surface 12 by the ribs 16 and 17 leaving a passage 11. This passage is thus continuously open over a large part of the span and hence the resistance offered to the free flow of the air therethrough is only small and unobjectionable.

Similarly flap 4 is formed with a hollow structural member 15 the upper surface of which forms part of the upper airfoil surface. It is spaced from the lower surface member 13 by ribs 18 and 19 leaving the communicating passage 10 which like passage 11 is substantially free and unobstructed.

It is also noted that in no relative position of the flaps is there any obstruction offered to the free flow of the air through the passages so constituted, portions 3a and 4a, even in the raised position of the flaps being non-interfering with respect to such flow. The structure is light and economical to construct. Furthermore the hollow interiors of the elements 14 and 15 may be used to house parts of the flap actuating mechanism where such parts will be out of the internal flow of air. These spaces may also be used as a receptacle to store gasoline and cargo to advantage since the weight thereof will oppose the lift on the flap, suitable means being provided in such case affording access thereto.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination in an aircraft, a wing flap having a slot in its upper surface in communication with the wing interior, a structural member extending spanwise of said wing flap to support the walls thereof, said member having a hollow cross section occupying a major portion of the depth of the flap and being spaced from the adjacent wall of the flap to define a passage communicating with said slot, and means for producing a flow of air through said slot and said passage.

2. In combination in an aircraft, a wing having a slot in its upper surface in communication with the wing interior, a structural member extending spanwise of said wing and having a surface thereof which forms a substantial part of the airfoil surface of the wing on one side thereof, said member having a hollow cross section occupying a major portion of the wing depth and being spaced from the opposite wall of the wing to define a passage communicating with said slot, and means for producing a flow of air through said slot and said passage.

3. In combination in an aircraft, a wing flap having a slot in its upper surface in communication with the wing interior, a structural member extending spanwise of said flap and having an upper surface thereof which forms part of the airfoil surface of the flap, said member having a hollow cross section occupying a major portion of the depth of the flap and having a lower surface spaced from the lower wall of the flap to define a passage communicating with said slot, and means for producing a flow of air through said slot and said passage.

4. In combination in an aircraft, a wing main body, a flap having a slot in its outer wall, means supporting said flap on said body for adjustment relative thereto, a structural member extending spanwise of said flap for supporting the upper and lower airfoil surfaces thereof, said member occupying a major portion of the cross sectional area of said flap and having one of its sides spaced inward from the adjacent airfoil surface of said flap to define therewith a passage communicating with said slot, and means to induce a flow through said slot and said passage.

5. In combination in an aircraft, a wing main body, a flap having a slot in its outer wall, means supporting said flap on said body for adjustment relative thereto, a structural member extending spanwise of said flap for supporting the upper and lower airfoil surfaces thereof, said member occupying a major portion of the cross sectional area of said flap and having one of its sides spaced inward from the adjacent airfoil surface of said flap to define therewith a passage communicating with said slot, and a plurality of spaced ribs for supporting said adjacent airfoil surface in spaced relation with respect to said member providing a structure having high strength while offering only small resistance to the flow of air through said passage.

6. In combination in an aircraft, a wing main body, a flap having a slot in its outer wall, means supporting said flap on said body for adjustment relative thereto, a structural member extending spanwise of said flap for supporting the upper and lower airfoil surfaces thereof, said member occupying a major portion of the cross sectional area of said flap and having one of its sides spaced inward from the adjacent airfoil surface of said flap to define therewith a passage communicating with said slot, said structural member having a hollow interior adapted for use as a receptacle, and means to induce a flow through said slot and said passage.

EDWARD A. STALKER.